March 1, 1966 L. H. GILLICK ETAL 3,237,545
HEATING AND VENTILATING SYSTEM FOR A VEHICLE
Filed Aug. 14, 1963 7 Sheets-Sheet 1

INVENTORS
LAURANCE H. GILLICK
JOSE MENENDEZ
ALEXANDER P. STIKKERS
BY
ATTORNEY

March 1, 1966     L. H. GILLICK ETAL     3,237,545
HEATING AND VENTILATING SYSTEM FOR A VEHICLE
Filed Aug. 14, 1963     7 Sheets-Sheet 2

*INVENTORS*
LAURANCE H. GILLICK
JOSE MENENDEZ
ALEXANDER P. STIKKERS
BY
ATTORNEY

March 1, 1966  L. H. GILLICK ETAL  3,237,545
HEATING AND VENTILATING SYSTEM FOR A VEHICLE
Filed Aug. 14, 1963  7 Sheets-Sheet 3

INVENTORS
LAURANCE H. GILLICK
JOSE MENENDEZ
ALEXANDER P. STIKKERS
BY
ATTORNEY

March 1, 1966 L. H. GILLICK ETAL 3,237,545
HEATING AND VENTILATING SYSTEM FOR A VEHICLE
Filed Aug. 14, 1963 7 Sheets-Sheet 4
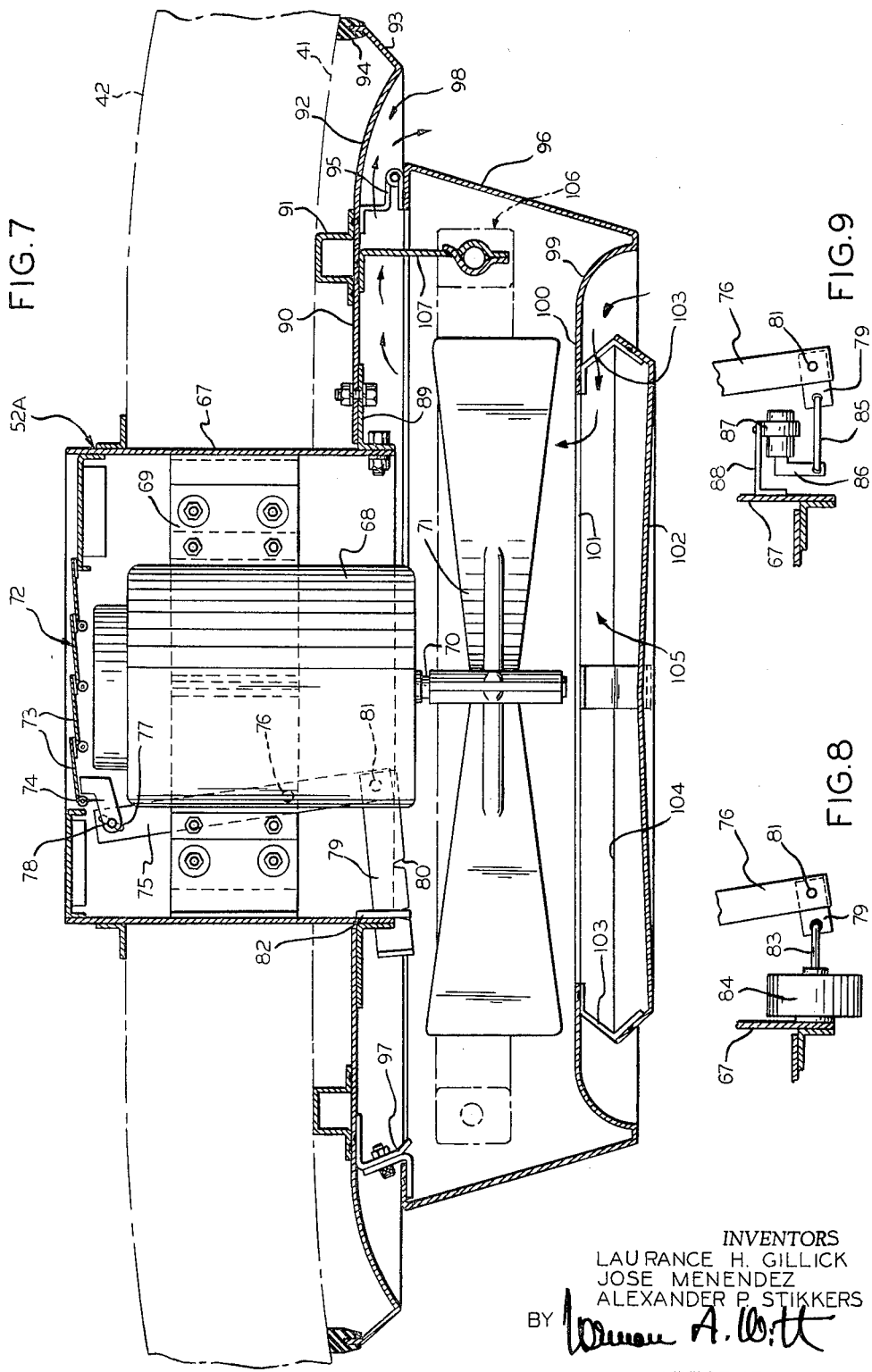
INVENTORS
LAURANCE H. GILLICK
JOSE MENENDEZ
ALEXANDER P. STIKKERS
BY
ATTORNEY March 1, 1966    L. H. GILLICK ETAL    3,237,545
HEATING AND VENTILATING SYSTEM FOR A VEHICLE
Filed Aug. 14, 1963    7 Sheets-Sheet 5

INVENTORS
LAURANCE H. GILLICK
JOSE MENENDEZ
ALEXANDER R. STIKKERS
BY
ATTORNEY

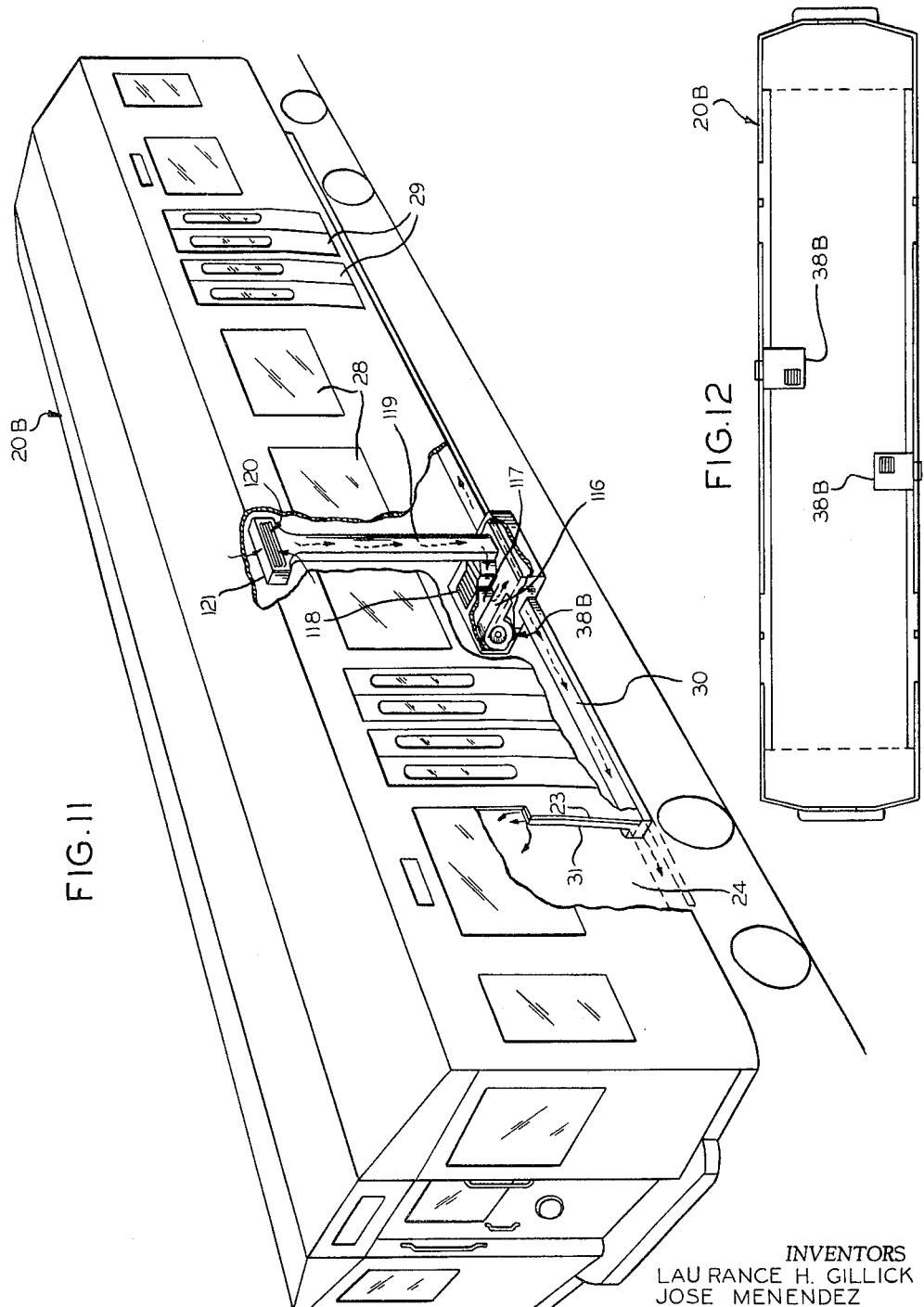

March 1, 1966     L. H. GILLICK ETAL     3,237,545
HEATING AND VENTILATING SYSTEM FOR A VEHICLE
Filed Aug. 14, 1963     7 Sheets-Sheet 7
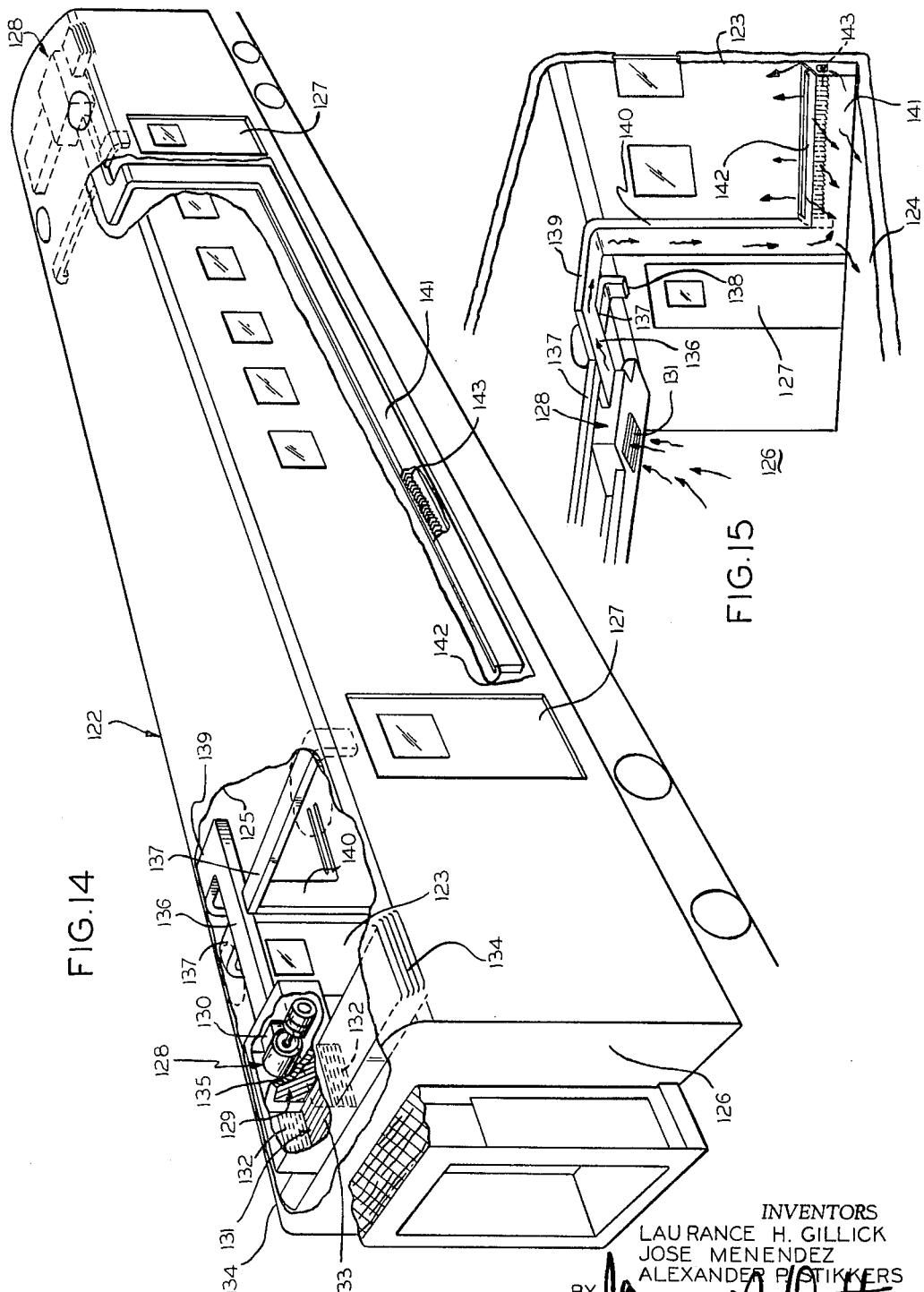
INVENTORS
LAURANCE H. GILLICK
JOSE MENENDEZ
ALEXANDER PLOTIKKERS
BY
ATTORNEY United States Patent Office 3,237,545
Patented Mar. 1, 1966

3,237,545
HEATING AND VENTILATING SYSTEM
FOR A VEHICLE
Laurance H. Gillick, Wilmette, Jose Menendez, Mundelein, and Alexander P. Stikkers, Elgin, Ill., assignors to Vapor Corporation, Chicago, Ill., a corporation of Delaware
Filed Aug. 14, 1963, Ser. No. 302,067
13 Claims. (Cl. 98—10)

This invention relates in general to a heating and ventilating system, and more particularly to a heating and ventilating system especially adapted for use in mobile vehicles, although other uses and purposes may be apparent to one skilled in the art in view of the following disclosure.

The heating and ventilating system of the present invention as used in a vehicle includes ducts arranged along the intersection of the floor and side walls which communicate upwardly with an elongated air passageway defined between the side walls and a partition or panel spaced therefrom. The upper ends of the panels terminate to define air openings with the side walls for distribution of air into the interior of the vehicle. A blower unit is mounted on the vehicle outside of the interior thereof having an outlet connected to the ducts, and an inlet connected to an opening into the interior of the vehicle and an opening to the exterior and atmosphere. A damper is provided at the opening to the exterior and atmosphere for controlling the amount of air admissible to the inlet of the blower unit. Suitable means is provided between the outlet of the blower unit and the air openings within the vehicle to condition or treat the air moving through the air openings. For example, it is desirable to control the temperature of the air by use of either heating elements or cooling elements to respectively raise or lower the temperature of the air. During the heating or cooling cycle, the damper is maintained in closed position to thereby cause the air to be recirculated within the vehicle. Should the outside temperatures be such that the outside air would aid in controlling the air temperature within the vehicle, the damper may be opened to thereby define a ventilating cycle and the drawing in to the vehicle of outside air. Further, the damper may be slightly open during a heating or cooling cycle to admit within the vehicle a certain percentage of fresh air. The capacity of the blower unit is such that a positive pressure will be maintained within the vehicle to thereby keep undesirable elements, such as dirt, out of the vehicle and prevent loss of excessive hot or cold air when the doors are opened.

The vehicle is preferably additionally provided with one or more circulating fans mounted at the ceiling, each of which has an inlet and an outlet communicating with the interior of the vehicle. An opening is provided from the circulating fan to the outside atmosphere which has a damper therein for selectively communicating the discharge side of the fan with the outside air. Heating or cooling elements may also be provided in the fan housing to additionally treat the air circulated therethrough when the damper is in closed position. With the outside temperatures permitting, the damper may be opened to provide ventilation and exhausting of air received through the inlet of the fan. The capacity of the circulating fan is such that it will not affect the positive pressure created within the vehicle by the blower unit to the extent that the positive pressure is eliminated.

Additional air openings may be provided in the ducts arranged at the intersection of the ceiling and side walls or at the lower portions of the panels extending upwardly from the ducts for bringing treated air into the vehicle at substantially floor level. This air at floor level is primarily useful in contacting the lower portions of a vehicle passenger's body, such as feet and legs, while the upper air openings cause the air discharged therefrom to blanket and/or wipe across the windows of the vehicle. Preferably, suitable means may be provided to control the air discharged from the openings at floor level, while the air openings at the upper level are always open.

Accordingly, it is an object of this invention to provide a new and improved heating and ventilating system for vehicles.

Another object of this invention resides in the provision of a heating and ventilating system for vehicles which is capable of having a high efficiency and of maintaining a positive air pressure within the vehicles to keep out dirt and other undesirable elements and to aid in the loss of excessive hot or cold air when the vehicle doors are open.

Still another object of this invention is in the provision of a heating and ventilating system for vehicle which includes combination floor and overhead heating units to give the most desired comfortable air conditions within the vehicle.

Another object of this invention is to provide a heating and ventilating system for vehicles which includes a blower unit for distributing atmospheric or treated air at floor and window levels, and an overhead circulating fan capable of enhancing the air circulation within the vehicle as well as to provide ventilation and exhaustion of air from the vehicle.

A further object of this invention resides in the provision of a heating and ventilating system for vehicles that includes an overhead circulating fan in combination with a blower unit for distributing air along the side walls of the vehicle, which overhead circulating fan is capable of exhausting air from the interior of the vehicle by selective operation of a damper that may be operated by a temperature responsive device.

Other objects, features and advantages of the invention will be apparent from the following detailed disclosure, taken in conjunction with the accompanying sheets of drawings, wherein like reference numerals refer to like parts, in which:

FIG. 7 is a modification of a ceiling circulating fan unit, shown in axial sectional view with some parts in full line view for purposes of clarity;

FIG. 8 is a detail diagrammatic view of a damper operator for the circulating fan unit of FIG. 7 and showing a modification of the operator shown in FIG. 7;

FIG. 9 is a detail view of a modified damper operator for the embodiment of FIG. 7;

FIG. 11 is a diagrammatic perspective view of a vehicle and showing still another modification of the blower unit;

FIG. 12 is a longitudinal sectional view, diagrammatic in form, of the vehicle of FIG. 11;

FIG. 14 is a diagrammatic perspective view of a vehicle other than the type illustrated in the other figures and showing an alternate form of the invention; and FIG. 15 is a diagrammatic cut-away view showing the interior of the vehicle of FIG. 14.

Figure 1:
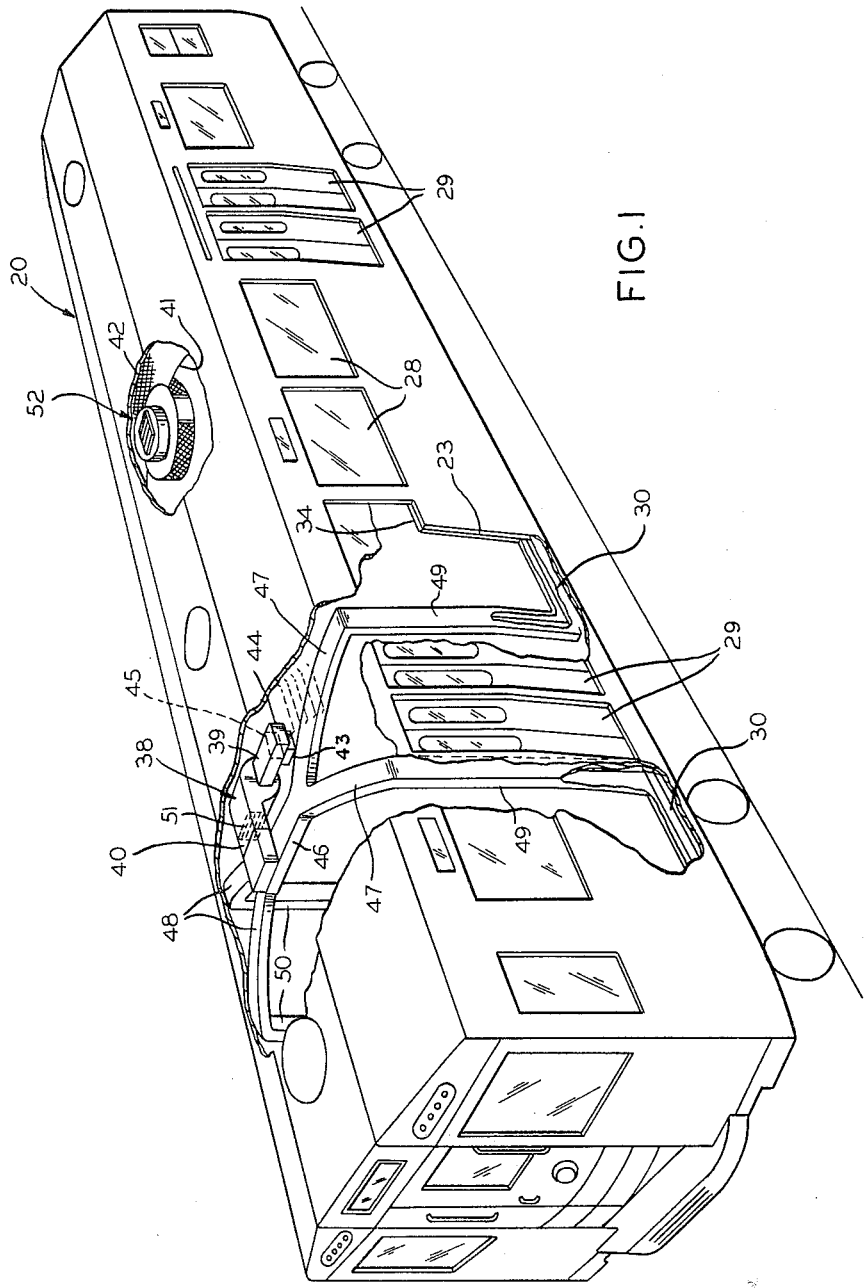
FIG. 1 is a somewhat diagrammatic view of a vehicle having cut-away portions to illustrate the heating and ventilating system of the present invention.

Referring now to the drawings and particularly to FIGS. 1–5, a railway vehicle 20 is illustrated as having the present invention associated therewith. It should be appreciated that the present invention may be efficiently and easily employed in other vehicles, such as buses or trucks, but that the present invention is generally employed for use in conditioning air within a vehicle for passenger or worker comfort. The railway vehicle 20 is illustrated as a subway car or the like having seats therein as indicated at 21 in FIG. 5 for transporting passengers between designated points. The present invention is also shown in use with a railway mail car, FIGS. 14 and 15, and as will be hereinafter more fully described, for providing comfort to the mail workers within the car.

The railway passenger car 20 includes generally opposed side walls 22 and 23, a floor 24, a ceiling 25 and opposed end walls 26 and 27. Suitable windows 28 are provided along the opposite side walls 22 and 23, and suitable passenger doors 29 are also provided along opposite side walls 22 and 23 and between some of the windows 28.

Figure 5:
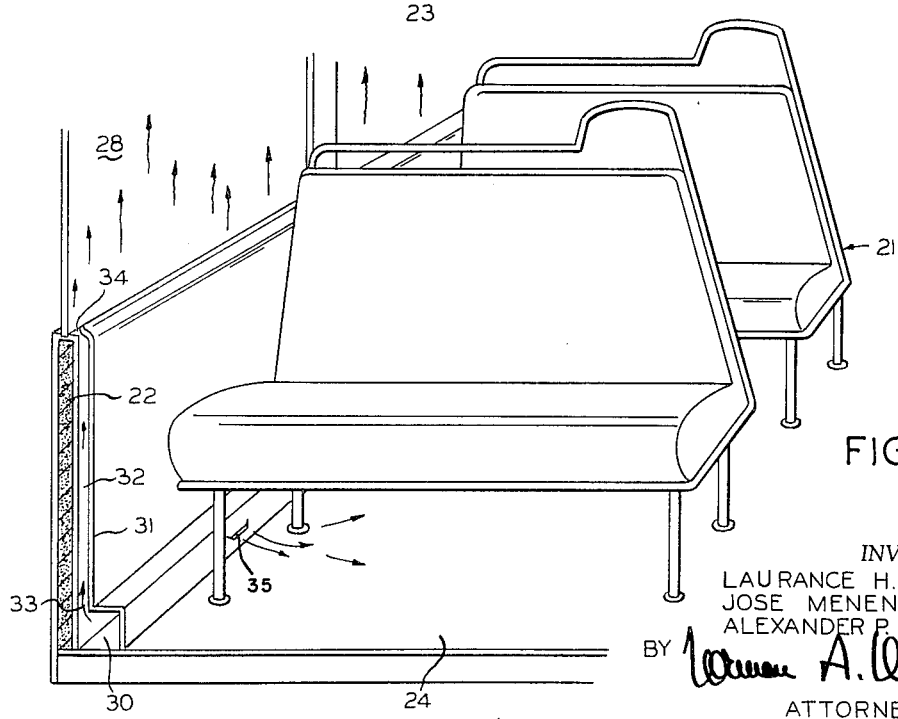
FIG. 5 is an enlarged diagrammatic fragmentary view of the interior of the vehicle of FIG. 1 and illustrating the discharge of air from the floor and window level openings.

Air ducts 30 are provided along opposite sides of the car at the intersection of the side walls and floor. These ducts only extend longitudinally between the doors and the ends of the car and the doors. Referring particularly to FIG. 5, a panel or partition 31 is arranged in spaced relationship with the side walls 22 and 23 to define an elongated shallow air passageway 32 with the corresponding side wall. The lower end of the passageways are in communication with the duct 30 by means of an opening 33 and the upper ends of the panel 31 terminate at the window level and define an air opening 34. The air opening 34 extends along the lower edge of the windows 28 and air discharged therefrom wipes across the window 28 and effectively covers the windows with a blanket of air. Thus, the air currents discharged from the opening 34 do not hit the passengers in the seats 21, although an air curtain is defined between the passengers and the windows.

Figure 13:
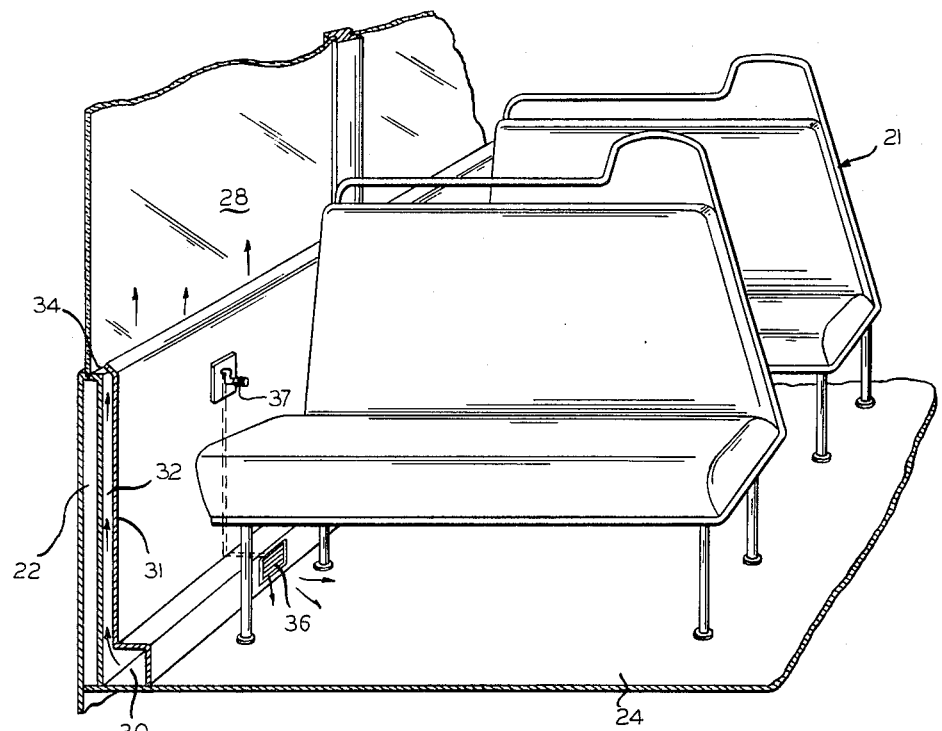
FIG. 13 is a detail perspective view similar to FIG. 5 but showing a modification wherein control means are provided for controlling the floor level air openings.

Additional floor level air openings 35 may be provided in the duct 30 as shown or at the lower end of the panels 31 to discharge air at substantially floor level across the lower extremities of a person in the seat 21 to provide additional air circulation within the vehicle. The opening 35 may be fixed or adjustable by providing a damper 36 which would allow the window-seat passenger to regulate the opening between zero and full by manipulation of the control 37 as shown in the embodiment of FIG. 13.

Referring again particularly to the embodiment of FIGS. 1–5, conditioned or outside air is delivered to the ducts 30 by means of a blower unit 38. As seen in FIG. 1, the blower unit 38 includes an inlet 39 and an outlet 40. The blower unit 38 in this embodiment is mounted in the roof of the vehicle 20, and preferably between a ceiling panel 41 and a roof panel 42. As will be hereinafter more fully explained and illustrated, the blower unit may be mounted at any desirable place on the vehicle.

The inlet 39 to the blower unit 38 includes a fixed opening 43 communicating with the interior of the vehicle and an opening 44 that includes a damper 45 for selectively opening and closing same. The opening 44 communicates with the exterior of the vehicle and the atmosphere.

The outlet 40 of the blower unit 38 is connected to a ceiling duct 46 extending transversely of the vehicle and in turn connected at opposite ends to smaller ceiling ducts 47 and 48. Vertical side wall ducts 49 and 50 are arranged at opposite sides of the car and are connected at their upper ends with the ceiling ducts 47 and 48, respectively, and at their lower ends with the ducts 30.

Means is provided for conditioning the air discharged through the outlet 40 of the blower unit 38 and ultimately from the openings 34 and 35 of the interior of the vehicle. This means may raise or lower the temperature of the air. For example, if the air is to be heated, electric heating elements such as indicated by the numeral 51 may be mounted at the outlet 40 of the blower unit 38 to heat the air distributed through the ducts 46, 47, 48, 49, 50 and 30. Additionally, if the air is to be cooled, an evaporator coil from a refrigeration unit may be mounted at the outlet 40. During the heating or cooling cycles, the damper 45 to the outside air may be closed, thereby permitting the air within the vehicle to be circulated and returned to the blower unit through the opening 43, or partially opened to permit a small percentage of fresh air to be introduced. Should it not be necessary to heat or cool the air to obtain comfort within the vehicle because of the outside temperature, opening of the damper 45 will set up a ventilating cycle which will bring in the maximum amount of outside air to be mixed with the recirculated air and provide passenger comfort. The damper 45 may be operated manually or automatically in response to the temperature desired within the vehicle. The capacity of the blower unit 38 is such as to create a positive pressure within the vehicle which effectively prevents the entrance of unfiltered outside air within the vehicle and also eliminates the loss of excessive hot or cold air when the doors 29 are open.

Figure 2:
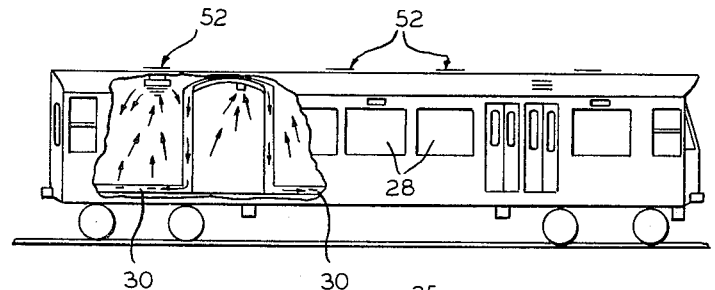
FIG. 2 is a somewhat diagrammatic view of the vehicle of FIG. 1 with portions broken away and illustrating the operation of the system during the heating cycle.
Figure 3:
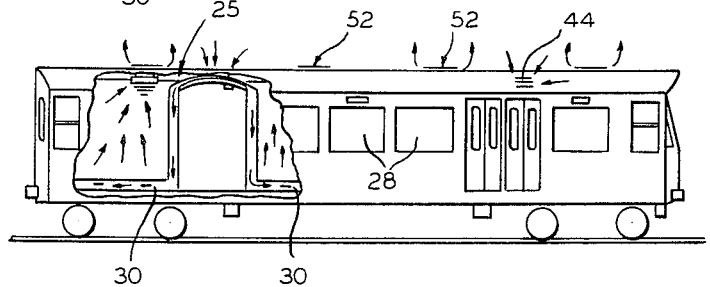
FIG. 3 is a somewhat diagrammatic view of the vehicle of FIG. 1 with portions broken away and illustrating the operation of the system during the ventilating cycle.
Figure 4:
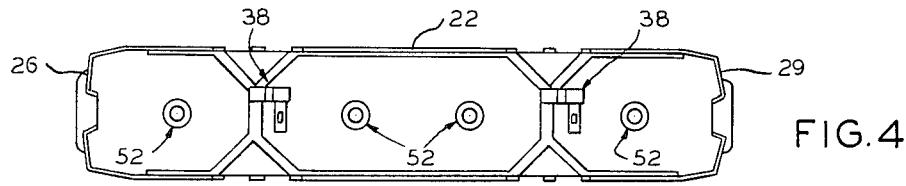
FIG. 4 is a diagrammatic longitudinal sectional view taken through the vehicle of FIG. 1 with parts removed for purposes of clarity and to show the ventilating system of the present invention.

The movement of the air during the heating cycle is illustrated by the arrows in FIG. 2, while during the ventilating cycle in FIG. 3.

A ceiling circulating fan unit 52, FIGS. 1–4 and 6, is provided in combination with the blower unit 38 for selectively increasing the air circulation within the vehicle or the ventilation by exhaustion of air from the vehicle. While any desired number of circulating fan units may be employed, the embodiment illustrated in FIGS. 1–4 utilizes four units spaced along the ceiling 25 of the vehicle. Further, two blower units 38 are provided as seen particularly in FIG. 4. Each circulating fan unit is operative to circulate the air in the area thereto, and includes an air inlet 53 and an air outlet 54, both in communication with the interior of the vehicle. A large bladed fan 55, carried on the motor shaft 56 of a motor 57, pumps the air between the inlet 53 and the outlet 54.

The fan unit housing includes a vertical cylindrical wall 58 extending between upper and lower radially extending walls 59 and 60, respectively. The inner periphery of the upper wall 59 connects to an upstanding diametrically reduced cylindrical wall 61 which projects through the area extending between the ceiling panel 41 and the roof panel 42 and opens outwardly of the roof panel to define an exhaust opening 62. A suitable damper 63 is provided in the exhaust opening to selectively open and close the opening. The motor 57 is suitably supported within the unit housing, and annular louvers 64, carried by the lower radial wall 60, coact therewith and with a cylindrical shroud 65 to define the outlet 54. The shroud 65 extends around the periphery of the fan blade 55 and defines the inlet 53 to the unit.

Suitable heating or cooling elements 66 are also supported within the unit housing and arranged to have the air pumped between the inlets 53 and the outlet 54 to wipe thereacross and raise or lower the air temperature, while the damper 63 is closed. Preferably, the circulating fan unit 52 operates continuously and will circulate the air within the vehicle and in its area, and additionally change the temperature of the air by heating or cooling same, depending upon the desires of the installation. Further, upon opening of the damper 63, a ventilating cycle is created whereby the air taken through the inlet 53 is exhausted through the exhaust opening 62 to the outside of the vehicle. Such a cycle would be desirable when the temperature within the car is high and no cooling means is provided to cool the air therein. During either hot or cold weather conditions, the circulating fan unit 52 will serve to supplement the heating or cooling conditions of the air within the vehicle, while at the same time increase the air circulation. The fan motor 57 may have different speeds to enhance its operation during a heating, cooling or ventilating cycle, but the capacity of the circulating fan unit is such that it will not change the positive air pressure condition within the vehicle as created by the floor units 38 to a negative air pressure condition during the ventilating cycle when the damper 63 is open and air is exhausted from the inside of the vehicle by the fan unit.

A modified circulating air fan unit is illustrated in FIG. 7 and generally designated by the numeral 52A. This unit operates in substantially the same manner as the embodiment 52 of FIG. 6, and differs primarily in structural features. The unit 52A includes a cylindrical housing 67 extending through the opposite sides of the ceiling and roof panels 41 and 42. An electric motor 68 is supported within the housing 67 by means of a bracket 69 and is provided with a shaft 70 having a large fan 71 mounted thereon and arranged below the ceiling panel 41. A damper 72 is provided at the upper end of the cylindrical housing 67 to selectively intercommunicate with the outside atmospheric air.

The damper 72 includes a plurality of movable louvers 73, all connected together and one of the louvers being connected to a lever 74. An arm 75, pivotally mounted on a pin 76, is provided with a slot 77 at its upper end for slidably receiving a pin 78 carried on the free end of the lever 74. Below the pivot pin 76, a control rod 79 having a plurality of notches 80 in its lower edge is pivotally connected at 81 to the lower end of the arm 75. A slotted hanger 82 is mounted at the lower periphery of the cylindrical housing 67 and slidably receives the control rod 79. When the control rod 79 is lowered by virtue of alignment of a notch 80 with the hanger 82 as seen particularly in FIG. 7, the control rod is locked in place and also locks in place the louvers 73 of the damper 72. By lifting up the control rod 79 and sliding it through the slotted hanger 82, opening and closing of the damper 72 may be accomplished. Thus, manual operation of the damper 72 is provided by the damper control shown in FIG. 7.

An alternate mechanism for controlling the operation of the damper 72 is shown in FIG. 8, wherein the control rod 79 is connected to a piston rod 83 of a pneumatic or fluid cylinder 84. Thus, operation of the pneumatic cylinder 84 accomplishes opening and closing of the damper 72. It should be appreciated that operation of the fluid cylinder 84 may be accomplished by remote control and may even be automatically associated with a particular cycle of operation of the fan unit.

Still another mechanism that may be employed for controlling operation of the damper 72 is shown in FIG. 9, wherein a link 85 is connected at one end to the control rod 79 and at the other end to a piston rod 86 of a temperature responsive device 87, the latter being mounted by means of a bracket 88 onto the cylindrical housing 67. Thus, depending upon the air temperature surrounding the temperature responsive unit 87, control of the damper 72 will be accomplished. In this regard, if the temperature is high enough, the temperature responsive device 87 will cause the damper 72 to open and thereby create a ventilating cycle for the circulating fan unit.

Referring again to FIG. 7, an annular bracket 89 is secured to the lower periphery of the cylindrical housing 67 and has mounted thereon a horizontally extending air deflection plate 90, annular in shape, that is in turn secured to brackets 91 fastened to the ceiling panel 41. A downwardly projecting arcuate portion 92 is provided at the outer peripheral edge of the plate 90 and is turned upwardly to define an inclined wall 93 that is sealed to the ceiling panel 41 by means of a flexible gasket 94.

A hinge 95 hingedly connects one side of a frustoconically shaped panel 96 to the underside of the plate 90, and preferably diametrically opposite of the hinge, a nut and bolt bracket unit 97 serves to hold the panel 96 in its closed position as shown in FIG. 7. An air outlet 98 is defined between the upper peripheral edge of the panel 96 and the plate 90.

At the lower end of the panel 96, an arcuate air deflector 99 is provided and terminates in an annular radially extending lip 100 below the outer peripheral area of the fan 71. A large opening 101 is provided in the lip 100 and in alignment with the fan 71.

A circular shield 102 is fastened by means of a plurality of brackets 103 to the underside of the lip 100 and across the opening 101. An upper peripheral edge 104 is spaced downwardly from the lip 100 and defines therewith an air inlet 105 that communicates with the opening 101. Thus, when the damper 72 is closed, the fan operating, air is drawn through the inlet 105 and expelled from the outlet 108 to effect air circulation within the vehicle. Similarly, as with the embodiment of FIG. 6, when the damper 72 is opened, a ventilating cycle is created which draws the air through the inlet 105 and through the exhaust opening at the upper end of the cylindrical housing 67.

Figure 6:
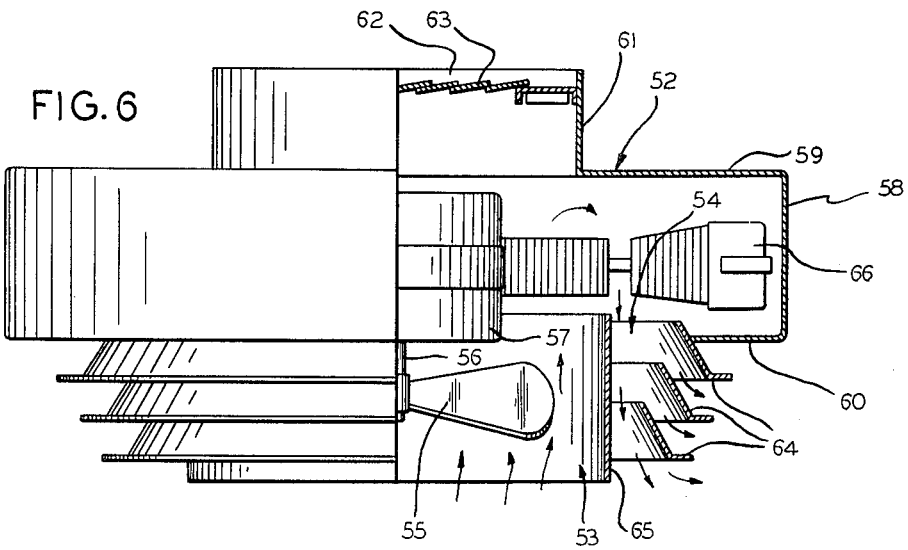
FIG. 6 is a somewhat diagrammatic view and quarter section of a circulating fan unit employed in the ventilating system of the present invention and mounted in the ceiling of the vehicle.

Heating or cooling elements 106 are supported within the panel 96 by means of hangers 107 for the same purpose as the heating or cooling element 66 in the embodiment of FIG. 6.

Figure 10:
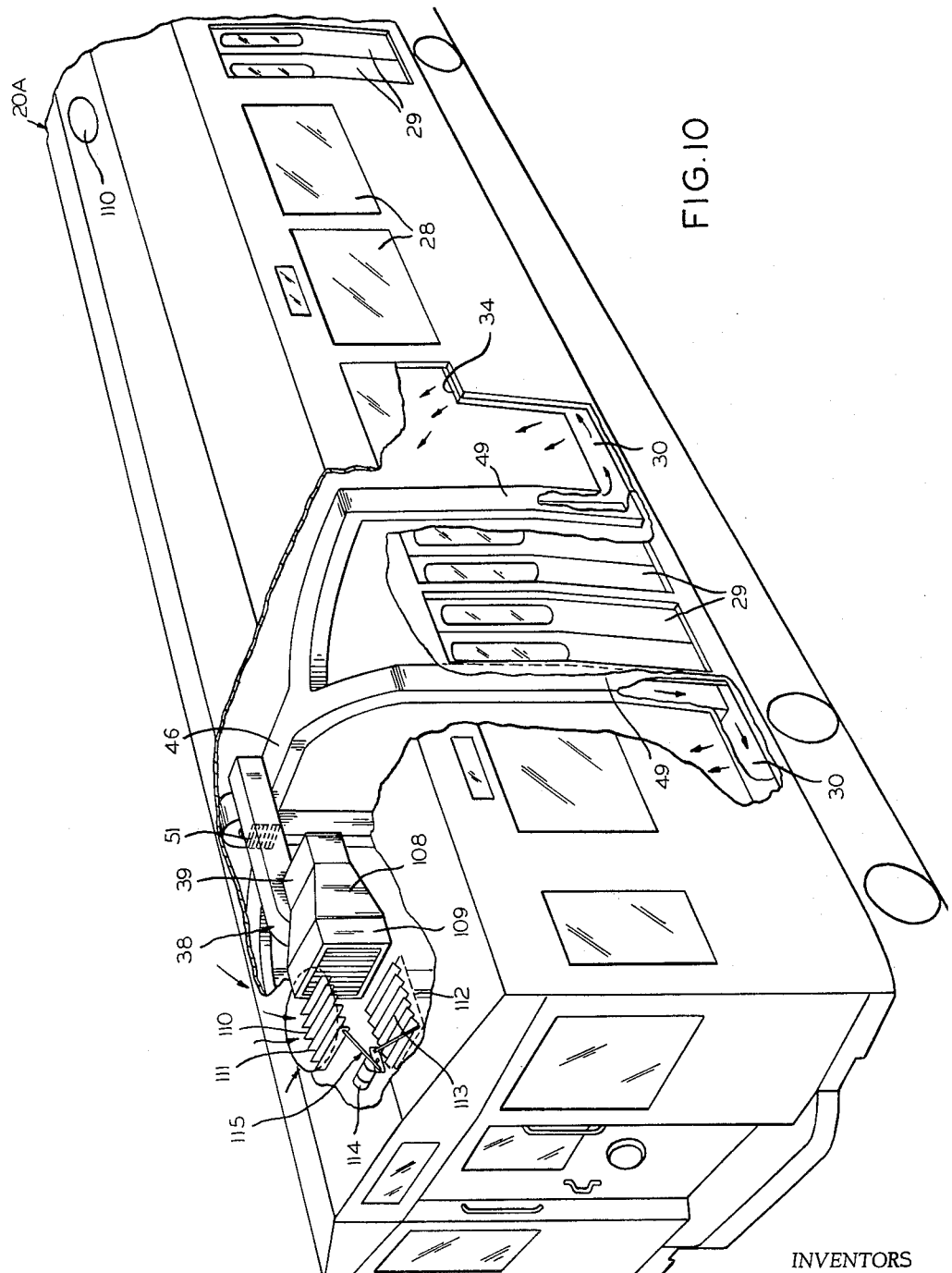
FIG. 10 is a diagrammatic perspective view of a vehicle embodying the present invention and a modification of the blower unit.

Referring now to FIG. 10, another embodiment of the invention is shown, wherein the railway car is generally designated by the numeral 20A. The structure of the railway car is identical with that of the car of FIG. 1, but the heating and ventilating system differs in the arrangement of the blower unit inlet which is specifically provided in combination with an air conditioning and a heating unit. Again, the circulating fan units in the ceiling of the car may also be provided and employed in the same manner as heretofore explained.

Inasmuch as many of the elements are substantially the same as that of FIG. 1, like numerals will be employed to indicate like elements.

The inlet 39 to the blower unit 38 is connected to ductwork 108 that is, in turn, provided at its inlet end with an evaporator 109 of a refrigeration machine. The inlet end of the evaporator 109 connects directly with an exhaust opening 110 having a damper 111, and a recirculating air opening 112 having a damper 113. A motor 114 is suitable connected with linkage 115 that is in turn connected with both dampers 111 and 113 to simultaneously operate the dampers between open and closed positions. For example, when the damper 111 is open to permit ventilation and the drawing of outside air into the vehicle, the damper 113 is closed to prevent the return of air to the inlet side of a blower unit from the interior of the vehicle. Further, it will be appreciated that intertermediate open and closed positions may be simultaneously provided with both dampers 111 and 113.

Another embodiment of the invention is illustrated in FIGS. 11 and 12, wherein the vehicle, designated generally by the numeral 20B, differs primarily in that the blower unit, designated by the numerals 38B, is mounted below the floor 24 of the vehicle rather than in the ceiling area. The blower unit 38B includes an outlet 116 that is directly connected with the lower ducts 30, and an inlet 117 communicating with heating or cooling elements 118 and a vertically extending duct 119. A dampered exhaust opening 120 is provided at the upper end of the vertical duct 116 on one side, while a fixed recirculated air inlet opening 121 is provided on the other side. A pair of blower units 38B are provided for the railway car of the embodiment, one serving the ducts 30 on one side of the car and the other serving the ducts 30 on the other side of the car as most clearly seen in FIG. 12. The general operation of this embodiment is like that of the other embodiments as far as heating, cooling and ventilating cycles.

Referring now to FIGS. 14 and 15, the application of the heating and ventilating system of the present invention to a railway mail car 122 is illustrated. This car includes opposed side walls 123, a floor 124, a roof or ceiling 125, and opposed end walls 126. Doors 127 are provided on the opposite side walls 123 for permitting access into the interior of the car. One or more blower units 128 are preferably suspended from the ceiling 125 at opposite ends of the car to generate the supply of circulating air within the vehicle.

Each blower unit includes an air inlet 129 and an air outlet 130. A plenum chamber 131 is provided ahead of the air inlet 129 and communicates at opposite ends with dampers 132 and therebelow with a recirculating air opening 133, the latter communicating with the interior of the vehicle. The dampers 132 in turn connect with fresh air intakes 134. A filter 135 is arranged in the air inlet 129 to filter the air distributed by the blower unit 128. It should be appreciated that filters may be applied in the other heretofore described embodiments where desired.

A main distribution duct 136 is connected to the air outlet of the blower unit. Transversely extending ducts 137 lead from the main distribution duct 136 to air openings 138 which serve to direct an air stream downwardly and across the doors 127.

Additionally, transversely extending ducts 139 connect the outer ends of the main duct 136 to vertically extending side wall ducts 140. The lower ends of the side wall ducts 140 connect to elongated floor level ducts 141 which extend preferably between the longitudinally spaced doors 127 on each side wall of the car. Longitudinally extending slots or openings 142 are provided along the upper edges of the ducts 141 for distribution of the air supply within the vehicle. Heating or cooling elements 143 are mounted within the ducts 141, over which the air wipes to raise or lower its temperature during a heating or cooling process. It should be understood that the heating or cooling elements 143 may be arranged anywhere in the ductwork between the outlet 130 of the blower unit 128 and the air distribution opening 138. Similarly, it should be understood that the heating or cooling elements in the heretofore described embodiments may also be mounted in the floor ducts as set forth in the embodiment of FIGS. 14 and 15. The general operation of the ventilating system of FIGS. 14 and 15 is identical with that of the systems in the heretofore described embodiments. Most likely, air conditioning would not be provided for a railway mail car, and therefore, the temperature controlling elements 143 would constitute heating strips or fins for use in heating the interior of the car during cool or cold weather.

It will be understood that modifications and variations may be effected without departing from the scope of the novel concepts of the present invention, but it is understood that this application is to be limited only by the scope of the appended claims.

The invention is hereby claimed as follows:

1. In a ventilating system for a vehicle having side and end walls, a ceiling, a floor, and doors in the side walls, ducts extending along the intersection of the side walls and floor, a partition along the opposite side walls defining therewith an elongated and shallow air passageway, each partition being arranged to provide intercommunication between the corresponding duct and lower end of the corresponding air passageway, each partition terminating upwardly of its corresponding duct to define with the corresponding side wall an air opening for distribution of air into said vehicle, a blower unit mounted on the outside of the vehicle having an air inlet and an outlet, means connecting the outlet to said ducts, means connecting the inlet to an opening to atmosphere and an opening to the interior of said vehicle, a damper between the opening to the atmosphere and the opening to the interior for controlling the amount of atmospheric air supplied to the blower unit inlet, means for controlling the temperature of the air discharged from said air opening, a circulating fan mounted on said ceiling having an air inlet and outlet within said vehicle, and a dampered opening in the ceiling communicating with the atmosphere, whereby said fan circulates air within the vehicle when the damper is closed and exhausts air from within the vehicle when the damper is open, and said blower unit being of such capacity as to maintain a positive pressure within the vehicle even when said dampered opening is open.

2. The combination as defined in claim 1, and an air opening in said air passageway at substantially floor level.

3. The combination as defined by claim 2, and means for adjustably controlling the floor level opening.

4. The combination as defined in claim 1, wherein said blower unit is mounted in the ceiling.

5. The combination as defined in claim 1, wherein said blower unit is mounted in the floor.

6. In a ventilating system for a vehicle having side and end walls, a ceiling, a floor, and doors in the side walls, ducts extending along the intersection of the side walls and floor, a partition along the opposite side walls defining therewith an elongated and shallow air passageway, each partition being arranged to provide intercommunication between the corresponding duct and lower end of the corresponding air passageway, each partition terminating upwardly of its corresponding duct to define with the corresponding side wall an air opening for distribution of air into said vehicle, a blower unit mounted on the outside of the vehicle having an air inlet and an outlet, means connecting the outlet to said ducts, means connecting the inlet to an opening to atmosphere and an opening to the interior of said vehicle, a damper between the opening to the atmosphere and the opening to the interior for controlling the amount of atmospheric air supplied to the blower unit inlet, means for controlling the temperature of the air discharged from said air opening, said temperature controlling means including heater elements mounted in the ducts extending between the blower unit outlet and the air openings, a circulating fan mounted on said ceiling having an air inlet and outlet within said vehicle, and a dampered opening in the ceiling communicating with the atmosphere, whereby said fan circulates air within the vehicle when the damper is closed and exhausts air from within the vehicle when the damper is open, and said blower unit being of such capacity as to maintain a positive pressure within the vehicle even when said dampered opening is open.

7. In a ventilating system for a vehicle having side and end walls, a ceiling, a floor, and doors in the side walls, ducts extending along the intersection of the side walls and floor, a partition along the opposite side walls defining therewith an elongated and shallow air passageway, each partition being arranged to provide intercommunication between the corresponding duct and lower end of the corresponding air passageway, each partition terminating upwardly of its corresponding duct to define with the corresponding side wall an air opening for distribution of air into said vehicle, a blower unit mounted on the outside of the vehicle having an air inlet and an outlet, means connecting the outlet to said ducts, means connecting the inlet to an opening to atmosphere and an opening to the interior of said vehicle, a damper between the opening to the atmosphere and the opening to the interior for controlling the amount of atmospheric air supplied to the blower unit inlet, means for controlling the temperature of the air discharged from said air opening, said temperature controlling means including cooling elements mounted in the ducts extending between the blower unit outlet and the air openings, a circulating fan mounted on said ceiling having an air inlet and outlet within said vehicle, and a dampered opening in the ceiling communicating with the atmosphere, whereby said fan circulates air within the vehicle when the damper is closed and exhausts air from within the vehicle when the damper is open, and said blower unit being of such capacity as to maintain a positive pressure within the vehicle even when said dampered opening is open.

8. In a ventilating system for a vehicle having side and end walls, a ceiling, a floor, and doors in the side walls, ducts extending along the intersection of the side walls and floor, a partition along the opposite side walls defining therewith an elongated and shallow air passageway, each partition being arranged to provide intercommunication between the corresponding duct and lower end of the corresponding air passageway, each partition terminating upwardly of its corresponding duct to define with the corresponding side wall an air opening for distribution of air into said vehicle, a blower unit mounted on the outside of the vehicle having an air inlet and an outlet, means connecting the outlet to said ducts, means connecting the inlet to an opening to atmosphere and an opening to the interior of said vehicle, a damper between the opening to the atmosphere and the opening to the interior for controlling the amount of atmospheric air supplied to the blower unit inlet, means for controlling the temperature of the air discharged from said air opening, said temperature controlling means including cooling elements mounted ahead of the blower unit inlet, a circulating fan mounted on said ceiling having an air inlet and outlet within said vehicle, and a dampered opening in the ceiling communicating with the atmosphere, whereby said fan circulates air within the vehicle when the damper is closed and exhausts air from within the vehicle when the damper is open, and said blower unit being of such capacity as to maintain a positive pressure within the vehicle even when said dampered opening is open.

9. In a ventilating system for a vehicle having side and end walls, a ceiling, a floor, and doors in the side walls, ducts extending along the intersection of the side walls and floor, a partition along the opposite side walls defining therewith an elongated and shallow air passageway, each partition being arranged to provide intercommunication between the corresponding duct and lower end of the corresponding air passageway, each partition terminating upwardly of its corresponding duct to define with the corresponding side wall an air opening for distribution of air into said vehicle, a blower unit mounted on the outside of the vehicle having an air inlet and an outlet, means connecting the outlet to said ducts, means connecting the inlet to an opening to atmosphere and an opening to the interior of said vehicle, a damper between the opening to the atmosphere and the opening to the interior for controlling the amount of atmospheric air supplied to the blower unit inlet, means for controlling the temperature of the air discharged from said air opening, a circulating fan mounted on said ceiling having an air inlet and outlet within said vehicle, and a dampered opening in the ceiling communicating with the atmosphere, whereby said fan circulates air within the vehicle when the damper is closed and exhausts air from within the vehicle when the damper is open, said blower unit being of such capacity as to maintain a positive pressure within the vehicle even when said dampered opening is open, and air openings for directing a blanket of air from the blower unit across a doorway.

10. In a ventilating system for a vehicle having side and end walls, a ceiling, a floor, and doors in the side walls, ducts extending along the intersection of the side walls and floor, a partition along the opposite side walls defining therewith an elongated and shallow air passageway, each partition being arranged to provide intercommunication between the corresponding duct and lower end of the corresponding air passageway, each partition terminating upwardly of its corresponding duct to define with the corresponding side wall an air opening for distribution of air into said vehicle, a blower unit mounted on the outside of the vehicle having an air inlet and an outlet, means connecting the outlet to said ducts, means connecting the inlet to an opening to atmosphere and an opening to the interior of said vehicle, a damper between the opening to the atmosphere and the opening to the interior for controlling the amount of atmospheric air supplied to the blower unit inlet, means for controlling the temperature of the air discharged from said air opening, said temperature controlling means including heater elements mounted in the ducts extending between the blower unit outlet and the air openings and cooling elements mounted ahead of the blower unit inlet, a circulating fan mounted on said ceiling having an air inlet and an outlet within said vehicle, and a dampered opening in the ceiling communicating with the atmosphere, whereby said fan circulates air within the vehicle when the damper is closed and exhausts air from within the vehicle when the damper is open, and said blower unit being of such capacity as to maintain a positive pressure within the vehicle even when said dampered opening is open.

11. In a ventilating system for a vehicle having side and end walls, a ceiling, a floor, and doors in the side walls, ducts extending along the intersection of the side walls and floor, a partition along the opposite side walls defining therewith an elongated and shallow air passageway, each partition being arranged to provide intercommunication between the corresponding duct and lower end of the corresponding air passageway, each partition terminating upwardly of its corresponding duct to define with the corresponding side wall an air opening for distribution of air into said vehicle, a blower unit mounted on the outside of the vehicle having an air inlet and an outlet, means connecting the outlet to said ducts, means connecting the inlet to an opening to atmosphere and an opening to the interior of said vehicle, a damper between the opening to the atmosphere and the opening to the interior for controlling the amount of atmospheric air supplied to the blower unit inlet, means for controlling the temperature of the air discharged from said air opening, a circulating fan mounted on said ceiling having an air inlet and outlet within the vehicle, an exhaust opening in the ceiling intercommunicating the air outlet with the atmosphere, damper means for selectively opening said exhaust opening, manual means for operating said damper means, whereby said fan circulates air within the vehicle when the damper is closed and exhausts air from within the vehicle when the damper is open, and said blower unit being of such capacity as to maintain a positive pressure within the vehicle the vehicle even when said dampered opening is open.

12. In a ventilating system for a vehicle having side and end walls, a ceiling, a floor, and doors in the side walls, ducts extending along the intersection of the side walls and floor, a partition along the opposite side walls defining therewith an elongated and shallow air passageway, each partition being arranged to provide intercommunication between the corresponding duct and lower end of the corresponding air passageway, each partition terminating upwardly of its corresponding duct to define with the corresponding side wall an air opening for distribution of air into said vehicle, a blower unit mounted on the outside of the vehicle having an air inlet and an outlet, means connecting the outlet to said ducts, means connecting the inlet to an opening to atmosphere and an opening to the interior of said vehicle, a damper between the opening to the atmosphere and the opening to the interior for controlling the amount of atmospheric air supplied to the blower unit inlet, means for controlling the temperature of the air discharged from said air opening, a circulating fan mounted on said ceiling having an air inlet and outlet within the vehicle, an exhaust opening in the ceiling intercommunicating the air outlet with the atmosphere, damper means for selectively opening said exhaust opening, fluid operated means for operating said damper means, whereby said fan circulates air within the vehicle when the damper is closed and exhausts air from within the vehicle when the damper is open, and said blower unit being of such capacity as to maintain a positive pressure within the vehicle even when said dampered opening is open.

13. In a ventilating system for a vehicle having side and end walls, a ceiling, a floor, and doors in the side walls, ducts extending along the intersection of the side walls and floor, a partition along the opposite side walls defining therewith an elongated and shallow air passageway, each partition being arranged to provide intercommunication between the corresponding duct and lower end of the corresponding air passageway, each partition terminating upwardly of its corresponding duct to define with the corresponding side wall an air opening for distribution of air into said vehicle, a blower unit mounted on the outside of the vehicle having an air inlet and an outlet, means connecting the outlet to said ducts, means connecting the inlet to an opening to atmosphere and an opening to the interior of said vehicle, a damper between the opening to the atmosphere and the opening to the interior for controlling the amount of atmospheric air supplied to the blower unit inlet, means for controlling the temperature of the air discharged from said air opening, a circulating fan mounted on said ceiling having an air inlet and outlet within the vehicle, an exhaust opening in the ceiling intercommunicating the air outlet with the atmosphere, damper means for selectively opening said exhaust opening, temperature responsive means for operating said damper means, whereby said fan circulates air within the vehicle when the damper is closed and exhausts air from within the vehicle when the damper is open, and said blower unit being of such capacity as to maintain a positive pressure within the vehicle even when said dampered opening is open.

References Cited by the Examiner

UNITED STATES PATENTS

| 2,009,823 | 7/1935 | Vulpen. | |
| 2,080,757 | 5/1937 | Blomberg | 98—14 |
| 2,605,690 | 8/1952 | Henney | 98—10 |
| 2,661,676 | 12/1953 | Farr | 98—10 |

FOREIGN PATENTS

| 637,699 | 5/1950 | Great Britain. |
| 799,557 | 8/1958 | Great Britain. |

MEYER PERLIN, *Primary Examiner.*